Patented May 1, 1934

1,957,375

UNITED STATES PATENT OFFICE

1,957,375

PROCESS OF PRODUCING A WINE

Georges Vingerhoets, Anvers, Belgium, assignor to Compagnie Internationale Oenologique, Anvers, Belgium No Drawing. Application August 11, 1930, Serial No. 474,670. In France January 18, 1930

7 Claims. (Cl. 195—36)

It has already been proposed to manufacture fermented beverages to be substituted for wine, using certain fruits exclusive of grapes, but the wines so produced differ clearly from grape wine in their flavor and chemical composition.

This invention relates to a method of making an alcoholic beverage having all the organoleptic and chemical characteristics of wine by fermenting substances other than grapes, this method being characterized in that, with the usual additions for making artificial wine, such as sugar, organic acids (for example, tartaric acid and citric acid), tannin or gallic acid and mineral substances (for example, alkali metal bisulfites and phosphates), use is made of a mixture of chick peas, green peas and yellow peas as the fermenting material giving the bouquet.

The product obtained by the use of the process according to the invention is a beverage identical with grape wine with respect to taste and even from the chemical standpoint, as may be verified by analysis; it also possesses all the hygienic and tonic properties.

Moreover, this process presents, in comparison with known processes using fruits, considerable practical advantages. In particular, the use of legumes, such as peas, is much more economical than that of fruits. Furthermore, it makes possible the preparation of the beverage in all places and in all seasons, which is obviously not the case with fruits.

The mixture of chick peas, green peas and yellow peas used, as well as the additional materials above mentioned, are treated, substantially according to the methods of modern œnological and œnotechnical wine making, the conversion agents used being either the usual ferments (elliptical or other yeasts) or soluble or diastase ferments (enzymes or sucrase or any others).

By way of example, the amounts to be used for 100 liters of beverage are:

1. 100 liters of water.
2. For legumes and sugar, for each percent. of alcohol:

Chick peas _____ 60 g.
Green peas _____ 40 g.
Yellow peas _____ 30 g.
Crystallized sugar _____ 1.7 kg.

3. The other products, always the same weight, whatever the alcohol percent.:

Citric acid _____ 100 g.
Tartaric acid _____ 120 g.
Tannin or gallic acid _____ 24 g.
Alkali metal bisulfites _____ 10 g.
Alkali metal phosphates _____ 20 g.

The treatment of these different products for obtaining the beverage comprises two operations:
A—manufacture of a "food" or base, and
B—manufacture proper of the beverage.

The following illustrates the manufacture of a hectoliter of wine having 10% alcohol by volume:

I.—Manufacture of the "food" or base (a) 1.3 kg. of legumes, decomposed as previously described, is taken in the following proportions:

Chick peas _____ 600 g.
Green peas _____ 400 g.
Yellow peas _____ 300 g.

(b) The following substances are intimately mixed:

Water _____ 1 liter
Sugar _____ 100 g.
Tartaric acid _____ 52 g.
Citric acid _____ 50 g.
Tannin or gallic acid _____ 24 g.

This mixture is subjected to boiling for about 10 minutes, after having added caramel, if desired.

(c) This solution is poured on the 1.300 kg. of legumes, previously crushed to the form of a paste, and the whole is mixed.

The entire mixture stands for one night and then it is spread on boards or cloths suspended in air and exposed to the sun or other drying means, taking care to work in a warm place. It is necessary to stir the product from time to time in order that it may dry uniformly, and if lumps are formed, they are broken up.

II.—Manufacture proper of the beverage (a) 17 kg. of crystallized sugar are dissolved in about 10 liters of water, with 50 g. of citric acid and 60 g. of tartaric acid in order to permit inversion of the sugar. This solution is boiled for several minutes and it is poured into a cask containing 80 liters of water, the whole being then mixed.

(b) A fermenting liquid is previously prepared in the following manner: Mixing 750 centiliters of water, and 150 g. of sugar, boiling this solution and placing it in a suitably strong container. When the temperature of the mixture has dropped to 30° C., 30 g. of "food" made according to I above, is added to it, and a spoonful or glass of the liquor of the wine desired to be reproduced, or selected ferments, is poured therein. The container is closed by a closure grooved so that carbonic acid can escape, and care is taken to maintain this mixture at about 30° C. Three days later, the micro-organisms will have attained the desired development.

(c) When the temperature of the liquid obtained by (a) has dropped to 30° C., there is added to it:

1.500 kg. of the base or "food" produced as indicated at I.

The fermenting liquid as indicated at (b) above,

Alkali metal bisulfites_____ 10 g.
Alkali metal phosphates_____ 20 g.

The fermentation is then regulated according to usual methods.

The alkali metal bisulphites are for example the bisulphite of potassium or the bisulfite of sodium. The alkali metal phosphates are potassium phosphate or sodium phosphate. A single bisulphite and a single phosphate are sufficient. The phosphate serves for the nourishment and the development of the ferment, and the bisulphite serves to prevent a too rapid fermentation and the development of foreign ferments.

It is understood that the above method may be used to produce an alcoholic drink having not more than the legal content of alcohol.

I claim:

1. A method of manufacture of an alcoholic beverage of the wine type comprising adding to water, with sugar, an organic acid taken from a group consisting of tartaric acid and citric acid and tannin, a mixture of chick peas, green peas and yellow peas as the fermentable material giving the bouquet and causing an alcoholic fermentation of the same.

2. A method of manufacturing an alcoholic beverage of the wine type comprising adding to water, with sugar, tartaric acid, citric acid and tannin, a mixture of chick peas, green peas and yellow peas as the fermentable material giving the bouquet and causing an alcoholic fermentation of the same.

3. A method of manufacturing an alcoholic beverage of the wine type comprising adding to water, with sugar, an organic acid taken from a group consisting of tartaric and citric acids, an alkali metal bisulfite, an alkali metal phosphate and tannin, a mixture of chick peas, green peas and yellow peas as fermentable material giving the bouquet and causing an alcoholic fermentation of the same.

4. A method of manufacturing an alcoholic beverage of the wine type comprising adding to water, with sugar, tartaric acid, citric acid, an alkali metal bisulfite, an alkali metal phosphate and tannin, a mixture of chick peas, green peas and yellow peas as fermentable material giving the bouquet and causing an alcoholic fermentation of the same.

5. A method of manufacturing an alcoholic beverage of the wine type comprising adding to water containing sugar and an addition of citric acid and tartaric acid, an intimate mixture of crushed chick peas, green peas, and yellow peas, said mixture being previously treated with an aqueous solution of sugar, tartaric acid, citric acid and tannin, and subjected to drying and causing an alcoholic fermentation of the same.

6. Method of manufacturing an alcoholic beverage having the taste and chemical composition of natural grape wine, comprising the alcoholic fermentation of an aqueous solution containing sugar and an organic acid taken from a group consisting of tartaric acid and citric acid, and gallic acid, to which is added a slight quantity of natural wine and a crushed mixture of chick peas, green peas and yellow peas.

7. The method of manufacturing an alcoholic beverage containing not more than the legal content of alcohol and having the taste and chemical composition of natural grape wine comprising the manufacture of a "food" by preparing a water solution sugar, tartaric acid, citric acid and tannin, boiling said solution, pouring said solution upon a crushed mixture of chick peas, green peas and yellow peas, mixing the entire composition and then drying it, then preparing a fermentable liquid by dissolving sugar in water, boiling said last named solution and then after cooling the same to about 30° C. adding to the solution a part of said first mentioned "food" and wine, then maintaining the liquid obtained several days at about 30° C. for the purpose of developing the ferments contained in said wine and then maunfacturing the beverage by preparing a water solution of sugar, citric acid and tartaric acid, boiling said solution, cooling it to about 30° C., adding to it the remainder of said "food", said fermentable liquid, an alkali metal bisulphite and an alkali metal phosphate and then causing an alcoholic fermentation of the complete solution.

G. VINGERHOETS.